United States Patent
Lee

(10) Patent No.: US 11,263,776 B2
(45) Date of Patent: Mar. 1, 2022

(54) OBJECT RECOGNITION SYSTEM AND METHOD USING ULTRASONIC SENSOR

(71) Applicant: CESIGN CO., LTD., Seongnam-si (KR)

(72) Inventor: Soo Hyoung Lee, Hwaseong-si (KR)

(73) Assignee: CESIGN CO., LTD., Seongnam-si (KR)

( * ) Notice: Subject to any disclaimer, the term of this patent is extended or adjusted under 35 U.S.C. 154(b) by 20 days.

(21) Appl. No.: 16/999,566

(22) Filed: Aug. 21, 2020

(65) Prior Publication Data

US 2021/0166415 A1 Jun. 3, 2021

(30) Foreign Application Priority Data

Nov. 28, 2019 (KR) .......................... 10-2019-0156090

(51) Int. Cl.
*G06T 7/73* (2017.01)
*G06K 9/00* (2006.01)
*G06K 9/62* (2022.01)

(52) U.S. Cl.
CPC ............ *G06T 7/73* (2017.01); *G06K 9/00201* (2013.01); *G06K 9/6232* (2013.01); *G06T 2207/10132* (2013.01)

(58) Field of Classification Search
CPC ........... G06K 9/00496; G06K 9/00523; G06K 9/0053; G06K 9/00536; G06K 9/00543; G06T 2207/10132; G01H 1/00; G01H 1/04; G01H 1/08; G01H 1/12; G01H 1/16; G01H 17/00

See application file for complete search history.

(56) References Cited

U.S. PATENT DOCUMENTS

| | | | | |
|---|---|---|---|---|
| 5,108,693 A | * | 4/1992 | Landry ................ | G01N 29/343 376/245 |
| 5,970,798 A | * | 10/1999 | Gleman et al. ......... | G01L 5/246 73/761 |
| 2013/0237825 A1 | * | 9/2013 | Sasaki .................. | A61B 8/0883 600/443 |
| 2020/0209346 A1 | * | 7/2020 | Kreiss ..................... | G01S 7/003 |
| 2020/0367853 A1 | * | 11/2020 | Yoo ........................ | A61B 8/085 |
| 2021/0035286 A1 | * | 2/2021 | Yoo ....................... | A61B 5/0002 |

FOREIGN PATENT DOCUMENTS

| | | |
|---|---|---|
| JP | 2016206011 A | 12/2016 |
| KR | 20080057499 A | 6/2008 |
| KR | 20130135016 A | 12/2013 |
| KR | 20150059191 A | 6/2015 |

OTHER PUBLICATIONS

Machine translation of KR 10-2008-0057499 A (published Jun. 2008). (Year: 2008).*

* cited by examiner

*Primary Examiner* — Andrew W Johns
(74) *Attorney, Agent, or Firm* — Cantor Colburn LLP

(57) ABSTRACT

An object recognition system using an ultrasonic sensor is proposed, the system including an amplifier amplifying an output of the ultrasonic sensor; an analog-to-digital converter converting an output of the amplifier into a digital signal; and a feature point extractor extracting feature points using an output of the analog-to-digital converter; and an object recognizer recognizing the object by using the feature points extracted from the feature point extractor.

12 Claims, 4 Drawing Sheets

OBJECT RECOGNITION SYSTEM AND METHOD USING ULTRASONIC SENSOR

BACKGROUND OF THE INVENTION

Field of the Invention

The present invention relates to an object recognition system and method using an ultrasonic sensor and, more specifically, to an object recognition system and method capable of simply recognizing an object using an ultrasonic sensor without complex image processing.

Description of the Related Art

In general, when recognizing objects using ultrasonic waves, a complex image processing process is required as disclosed in Korean Patent Publication No. 10-2015-0059191 (Method of recognition and tracking underwater objects using real-time image processing of sonar images).

Alternatively, when simply recognizing objects without image processing, a sensor that measures distance by detecting the reflected signal from the signal output from the ultrasonic sensor is mainly used. That is, when there is only an ultrasonic sensor, it is possible to know the distance to the target object, but it is impossible to know what the object is. For reference, when measuring the distance using an ultrasonic sensor, only the maximum signal size of the reflected wave is measured and analyzed.

Therefore, when a method capable of simply recognizing objects using an ultrasonic sensor without complicated image processing is developed, it is possible to expect higher effects at a low cost.

SUMMARY OF THE INVENTION

Accordingly, the present invention has been made keeping in mind the above problems occurring in the related art, and an objective of the present invention is to provide an object recognition system and method capable of simply recognizing an object using an ultrasonic sensor without complicated image processing.

In order to achieve the above objective, an object recognition system using an ultrasonic sensor is provided, the system including an amplifier amplifying an output of the ultrasonic sensor; an analog-to-digital converter converting an output of the amplifier into a digital signal; and a feature point extractor extracting feature points using an output of the analog-to-digital converter.

Specifically, the feature point extractor may extract, as the feature points, magnitude values of at least two signals or values using the magnitude values of the at least two signals, in which each of the at least two signals is one peak signal of: a first peak signal corresponding to a signal of the largest value; an N-th peak signal that is one of peak signals output after the first peak signal; and an M-th peak signal that is one of peak signals output after the N-th peak signal, among the output of the analog-digital converter in a reflected wave section detected by the ultrasonic sensor.

In addition, the feature point extractor may further extract, as the feature points, at least one interval value or a value using the at least one interval value, in which each of the at least one interval value is a value of one time interval of: a first time interval that is a time interval between the first peak signal and the N-th peak signal; a second time interval that is a time interval between the first peak signal and the M-th peak signal; a third time interval that is a time interval between the N-th peak signal and the M-th peak signal; and a fourth time interval that is a time interval between the first peak signal and a K-th signal; and the K-th signal has a magnitude of a value of a first ratio of a magnitude value of the first peak signal, or a value greater than a smallest value, by a second value, among the output of the analog-digital converter in the reflected wave section detected by the ultrasonic sensor.

Preferably, the object recognition system may further include an object recognizer recognizing the object by using the feature points extracted from the feature point extractor.

Specifically, the object recognizer may determine the object as a first group of objects, when one peak value is extracted from the output of the analog-digital converter in a reflected wave section detected by the ultrasonic sensor as the feature points extracted from the feature point extractor; and the object recognizer may determine the object as a second group of objects, when multiple peak values are extracted from the output of the analog-digital converter in the reflected wave section detected by the ultrasonic sensor as the feature points extracted from the feature point extractor.

In addition, the object recognizer may identify the object by comparing the feature points extracted from the feature point extractor and feature points for each object stored in advance.

In order to achieve the above objective, an object recognition method using an ultrasonic sensor is provided, the method including: amplifying an output of the ultrasonic sensor; converting an output resulting from the amplifying into a digital signal; and extracting feature points using an output resulting from the converting.

Specifically, the extracting of the feature points may include extracting, as the feature points, magnitude values of at least two signals or values using the magnitude values of the at least two signals, wherein each of the at least two signals is one peak signal of: a first peak signal corresponding to a signal of the largest value; an N-th peak signal that is one of peak signals output after the first peak signal; and an M-th peak signal that is one of peak signals output after the N-th peak signal, among the output of the converting in a reflected wave section detected by the ultrasonic sensor.

In addition, the extracting of the feature points may include further extracting, as the feature points, at least one interval value or a value using the at least one interval value, in which each of the at least one interval value is a value of one time interval of: a first time interval that is a time interval between the first peak signal and the N-th peak signal; a second time interval that is a time interval between the first peak signal and the M-th peak signal; a third time interval that is a time interval between the N-th peak signal and the M-th peak signal; and a fourth time interval that is a time interval between the first peak signal and a K-th signal; and the K-th signal has a magnitude of a value of a first ratio of a magnitude value of the first peak signal, or a value greater than a smallest value, by a second value, among the output of the converting in the reflected wave section detected by the ultrasonic sensor.

In addition, the object recognition method may further include recognizing the object by using the feature points extracted from the extracting of the feature points.

Specifically, the recognizing of the object may include determining the object as a first group of objects, when one peak value is extracted from the output from the converting in a reflected wave section detected by the ultrasonic sensor as the feature points extracted from the extracting of the feature points; and determining the object as a second group of objects, when multiple peak values are extracted from the output from the converting in the reflected wave section detected by the ultrasonic sensor as the feature points extracted from the extracting of the feature points.

In addition, the recognizing of the object may include identifying the object by comparing the feature points extracted from the extracting of the feature points and feature points for each object stored in advance.

According to the object recognition system and method using the ultrasonic sensor of the present invention, it is possible to simply recognize objects using the ultrasonic sensor without complicated image processing.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Hereinafter, a system and method of recognizing objects using an ultrasonic sensor according to an embodiment of the present invention will be described in detail with reference to the accompanying drawings.

The following examples of the present invention are intended to embody the present invention, but do not limit the scope of the present invention. What can be easily inferred by experts in the technical field to which the present invention belongs from the detailed description and examples of the present invention is interpreted as belonging to the scope of the present invention.

Figure 1:
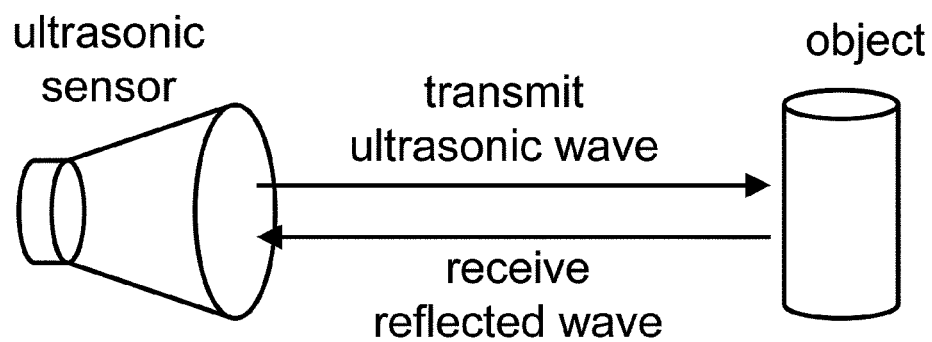
FIG. 1 is an explanatory diagram showing a measurement method using an ultrasonic sensor.
Figure 2A:
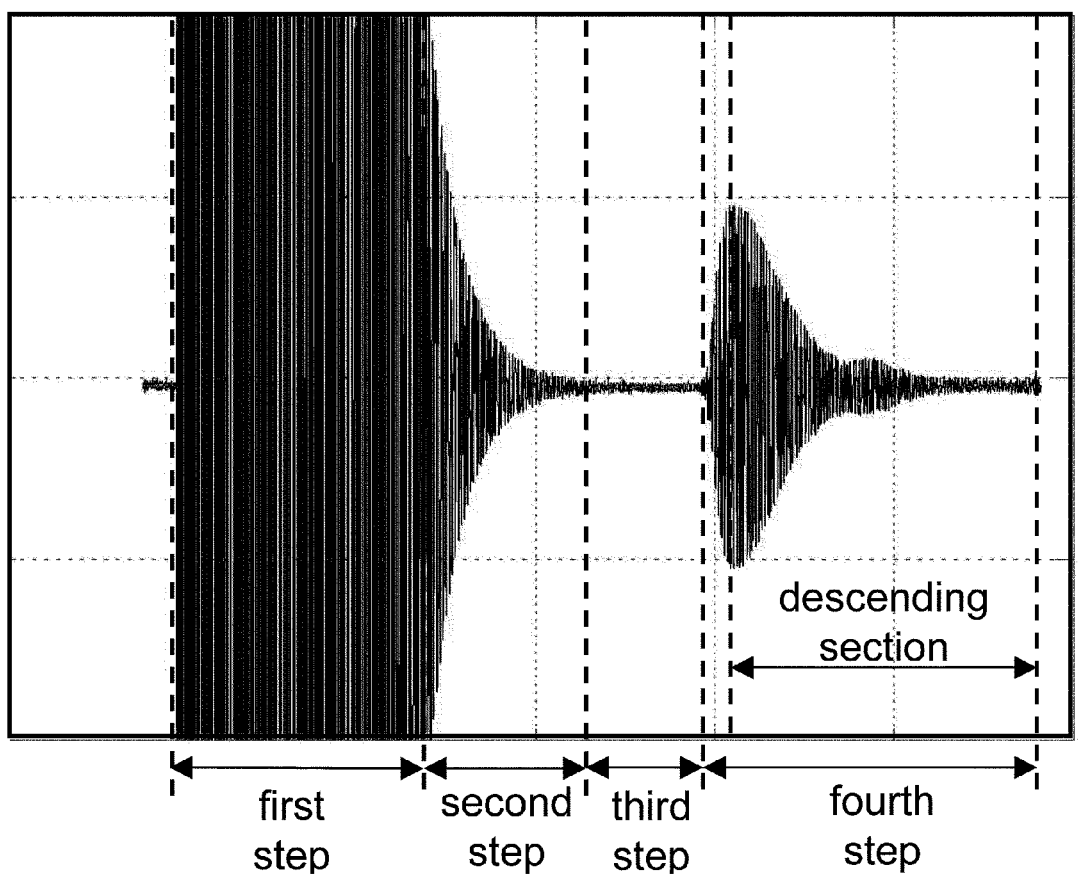
FIGS. 2A and 2B are waveform diagrams showing an output of an ultrasonic sensor.
Figure 2B:
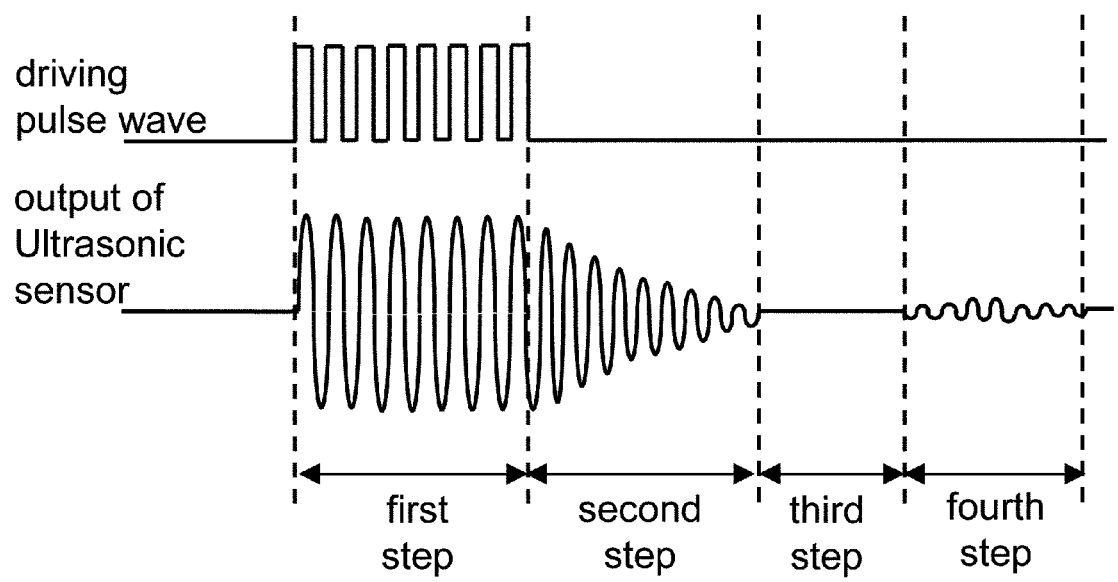

First, FIG. 1 is an explanatory diagram showing a measurement method using an ultrasonic sensor; and FIGS. 2A and 2B are waveform diagrams showing an output of an ultrasonic sensor. For reference, FIG. 2B is a simplified view of the waveform of FIG. 2A for the purpose of explanation.

A measurement method employed by an ultrasonic sensor will be briefly described referring to FIGS. 1, 2A, and 2B.

First, a driving pulse wave is driven from an ultrasonic sensor for a predetermined time, and the ultrasonic sensor receives a corresponding signal.

Herein, considering the output from the ultrasonic sensor, a driving pulse wave is output in a first step, and a transmission and reception transition period in which the signal is gradually attenuated appears in a second step.

In addition, the output from the ultrasonic sensor is not detected in a third step, and a section in which a reflected wave reflected off the object is output appears in a fourth step. The section of the fourth step is a sensing section of the ultrasonic sensor and is used for distance measurement.

For reference, briefly considering characteristics of the reflected wave, the density of the object does not significantly affect the signal waveform of the reflected wave, and the shape of the surface mainly affects the signal waveform of the reflected wave. For example, a waveform reflected on a sign and a waveform reflected on person's clothes appear different from each other.

According to the present invention, the object is simply recognized without image processing by using the characteristics of the reflected waves that appear differently depending on the objects. That is, whether the object is a topographical feature in the water, seaweed, a mud flat, or a fish may be determined using a waveform of the reflected wave.

Figure 3:
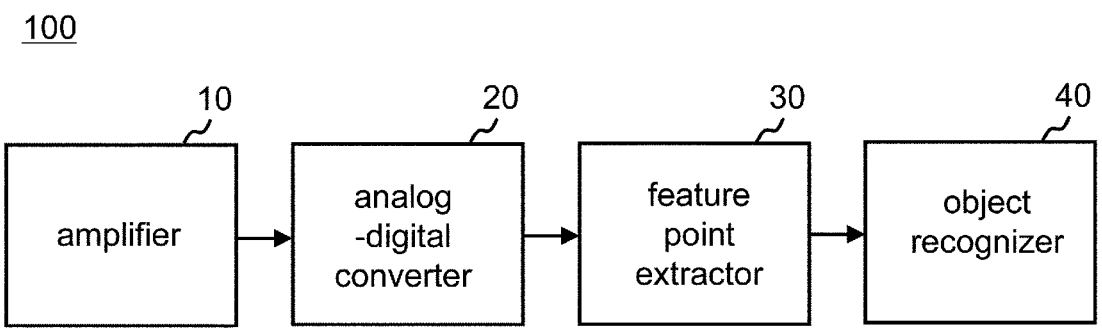
FIG. 3 is a block diagram showing an object recognition system using an ultrasonic sensor according to a preferred embodiment of the present invention.

FIG. 3 is a configuration diagram showing an object recognition system 100 using an ultrasonic sensor according to an exemplary embodiment of the present invention.

As can be seen from FIG. 3, the object recognition system 100 using an ultrasonic sensor according to a preferred embodiment of the present invention may be configured to include an amplifier 10, an analog-digital converter 20, a feature point extractor 30, and an object recognizer 40.

For reference, the amplifier 10 and the analog-to-digital converter 20 may be implemented by a circuit. In addition, the feature point extractor 30 and the object recognizer 40 may use a circuit or a processor. However, it is desirable that the feature point extractor 30 and the object recognizer 40 are implemented using a processor.

The amplifier 10 serves to amplify the output of the ultrasonic sensor. In addition, the analog-digital converter 20 converts an output of the amplifier 10, which is an analog signal, into a digital signal.

In addition, the feature point extractor 30 serves to extract feature points using an output of the analog-digital converter 20.

Figure 4:
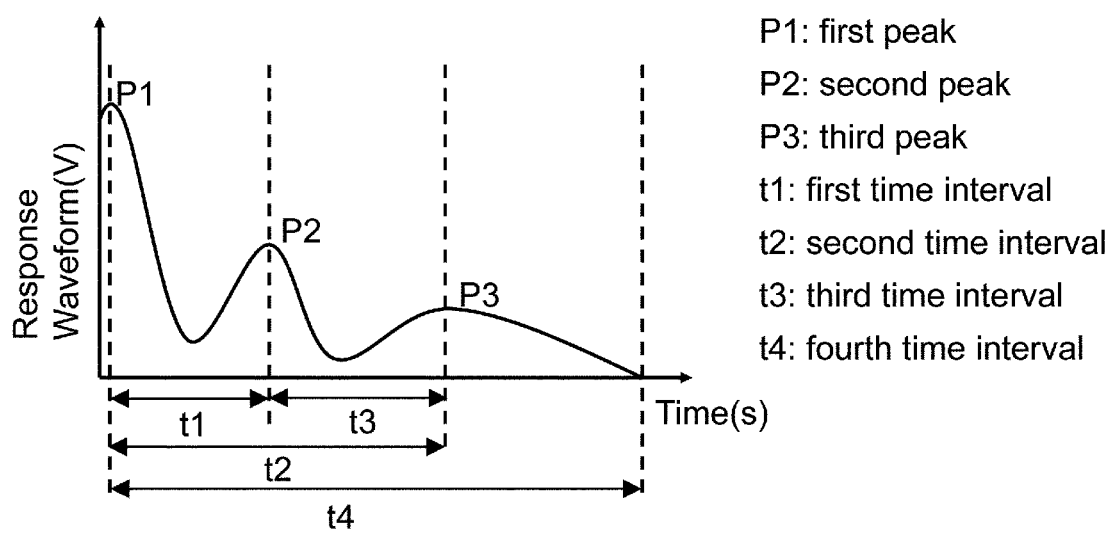
FIG. 4 is a waveform diagram showing a reflected wave section among output waveforms of an ultrasonic sensor.

FIG. 4 shows a waveform of a reflected wave section among output waveforms of an ultrasonic sensor.

However, referring to FIG. 4, in a reflected wave section among output waveforms of the ultrasonic sensor, after a rising section in which a magnitude thereof increases rapidly, a descending section in which a magnitude thereof decreases slowly is illustrated.

It is preferable that the feature point extractor 30 is used from the start point of this descending section according to the present invention.

That is, the feature point extractor 30 may extract, as the feature points, magnitude values of at least two signals of a first peak signal corresponding to a signal of the largest value; an N-th peak signal that is one of peak signals output after the first peak signal; and an M-th peak signal that is one of peak signals output after the N-th peak signal, from the output of the analog-digital converter 20 in the reflected wave section detected by the ultrasonic sensor. Alternatively, the feature point extractor 30 may extract, as the feature points, values using the magnitude values of the at least two signals, For example, N may be set to 2, and M may be set to 3. In FIG. 4, it is shown that N is set to 2, and M is set to 3.

In addition, the values using the magnitude values of the at least two signals means values obtained by correcting a signal intensity that varies depending on the distance to an object, for example, values obtained by dividing a value of each peak signal by a value of the first peak signal.

In addition, in the case of a waveform of the reflected wave in which only the first peak signal appears, magnitude values of the N-th peak signal and the M-th peak signal, or values using the magnitude values do not have the feature points, but may be defined as "no signal" as feature points.

In addition, the feature point extractor 30 further extract, as the feature points, at least one interval value of a first time interval that is a time interval between the first peak signal and the N-th peak signal; a second time interval that is a time interval between the first peak signal and the M-th peak signal; a third time interval that is a time interval between the N-th peak signal and the M-th peak signal; and a fourth time interval that is a time interval between the first peak signal and a K-th signal. Alternatively, the feature point extractor 30 further extract, as the feature points, a value using the at least one interval value.

The value using the at least one interval value may be, for example, a value obtained by dividing each interval value by a value of the fourth time interval.

In the case of a waveform of the reflected wave in which only the first peak signal appears, values of the first time interval, the second time interval, and the third time interval, or values using the interval values do not have feature points, but are defined as "no signal" as feature points.

Here, the K-th signal is characterized in that the signal has a magnitude of a value of a first ratio of a magnitude value of the first peak signal, or a value greater than the smallest value, by a second value, among the output of the analog-digital converter 20 in the reflected wave section detected by the ultrasonic sensor. That is, the K-th signal is a signal related to the end point of the reflected wave section in which the reflected wave of the ultrasonic sensor is no longer output. Here, the first ratio is preferably less than 0.1, and the second value may be 0 or more. For reference, in FIG. 4, the K-th signal has a value larger than the smallest value by the second value, in which the second value is set to 0.

The object recognizer 40 serves to recognize an object by using the feature points extracted from the feature point extractor 30. The object recognizer 40 may use artificial intelligence. Herein, when using such artificial intelligence, it is necessary to use a more expensive processor. Therefore, according to the present invention, it is intended to implement the object recognizer 40 by a simpler algorithm.

For example, the object recognizer 40 may determine the corresponding object as a first group of objects, when one peak value is extracted from the output of the analog-digital converter 20 in the reflected wave section detected by the ultrasonic sensor as the feature points extracted from the feature point extractor 30. In addition, the object recognizer 40 may determine the corresponding object as a second group of objects, when multiple peak values are extracted from the output of the analog-digital converter 20 in the reflected wave section detected by the ultrasonic sensor as the feature points extracted from the feature point extractor 30. The first group of objects may be, for example, objects with a smooth outer surface, and the second group of objects may be, for example, a person wearing clothing. That is, in the case of the object with a smooth outer surface, the reflected wave appears in such a way to gradually decrease without fluctuation in the falling section, after passing through the rising section.

Alternatively, the object recognizer 40 may compare the feature points extracted from the feature point extractor 30 with feature points for each object stored in advance, thereby identifying the corresponding object.

More specifically, the object recognizer 40 may identify the corresponding object by multiplying each of absolute values of differences between the feature points extracted from the feature point extractor 30 and the feature points for each object stored in advance by a preset weight, and then summing values resulting from the multiplying.

For example, assuming that three feature points f1, f2, and f3 are extracted by the feature point extractor 30, three feature points a1, a2, and a3 are stored in advance for the first object, and the weights w1, w2, and w3 are preset for each feature point.

Herein, a sum value S may be calculated as (w1×|f1−a1|)+(w2×|f2−a2|)+(w3×|f3−a3|). In addition, the object recognizer 40 identifies the object having the corresponding feature points when the sum value is the smallest value, as an object detected by the reflected wave. However, when the smallest sum value is greater than or equal to a predetermined value, the object recognizer 40 may specify the object as a value indicating that "the object does not correspond to a specific object stored in advance".

Hereinafter, a method of recognizing an object using an ultrasonic sensor according to a preferred embodiment of the present invention will be described.

Since an object recognition method using the ultrasonic sensor according to an embodiment of the present invention uses the object recognition system 100 using the ultrasonic sensor according to an embodiment of the present invention, it goes without saying that the object recognition method includes all features of the object recognition system 100, unless separately described.

The object recognition method using an ultrasonic sensor according to an embodiment of the present invention includes: an amplifying step of amplifying an output of the ultrasonic sensor; an analog-to-digital conversion step of converting an output in the amplification step into a digital signal; a feature point extraction step of extracting feature points using an output in the analog-digital conversion step; and an object recognition step of recognizing an object by using feature points extracted in the feature point extraction step.

Specifically, the feature point extraction step is to extract, as the feature points, magnitude values of at least two signals of a first peak signal corresponding to a signal of the largest value; an N-th peak signal that is one of peak signals output after the first peak signal; and an M-th peak signal that is one of peak signals output after the N-th peak signal, from the output of analog-to-digital conversion step in the reflected wave section detected by the ultrasonic sensor. Alternatively, the feature point extraction step is to extract, as the feature points, values using the magnitude values of the at least two signals, For example, N may be set to 2, and M may be set to 3.

In addition, the values using the magnitude values of the at least two signals means values obtained by correcting a signal intensity that varies depending on the distance to an object, for example, values obtained by dividing values of each peak signal by a value of the first peak signal.

In addition, in the case of a waveform of the reflected wave in which only the first peak signal appears, magnitude values of the N-th peak signal and the M-th peak signal, or values using the magnitude values do not have the feature points, but may be defined as "no signal" as feature points.

In addition, the feature point extraction step is preferably to extract, as the feature points, at least one interval value of a first time interval that is a time interval between the first peak signal and the N-th peak signal; a second time interval that is a time interval between the first peak signal and the M-th peak signal; a third time interval that is a time interval between the N-th peak signal and the M-th peak signal; and a fourth time interval that is a time interval between the first peak signal and a K-th signal. Alternatively, the feature point extraction step is preferably to extract, as the feature points, a value using the at least one interval value.

The values using the at least one interval value may be, for example, values obtained by dividing each interval value by a value of the fourth time interval.

In the case of a waveform of the reflected wave in which only the first peak signal appears, values of the first time interval, the second time interval, and the third time interval, or values using the interval values do not have feature points, but are defined as "no signal" as feature points.

Here, the K-th signal is characterized in that the signal has a magnitude of a value of a first ratio of a magnitude value of the first peak signal, or a value greater than the smallest value, by a second value, among the output of the analog-digital conversion step in the reflected wave section detected by the ultrasonic sensor. That is, the K-th signal is a signal related to the end point of the reflected wave section in which the reflected wave of the ultrasonic sensor is no longer output.

In addition, the object recognition step may determine the corresponding object as a first group of objects, when one peak value is extracted from the output of the analog-digital conversion step in the reflected wave section detected by the ultrasonic sensor, as the feature points extracted in the feature point extraction step. In addition, the object recognition step may determine the corresponding object as a second group of objects, when multiple peak values are extracted from the output of the analog-digital conversion step in the reflected wave section detected by the ultrasonic sensor, as the feature points extracted from the feature point extraction step.

Alternatively, the object recognition step may compare the feature points extracted in the feature point extraction step with feature points for each object stored in advance, thereby identifying the corresponding object.

As described above, according to the object recognition system 100 and the object recognition method using the ultrasonic sensor of the present invention, it can be seen that the object can be simply recognized using the ultrasonic sensor without complicated image processing.

What is claimed is:

1. An object recognition system using an ultrasonic sensor, the system comprising:
   an amplifier amplifying an output of the ultrasonic sensor;
   an analog-to-digital converter converting an output of the amplifier into a digital signal; and
   a feature point extractor extracting feature points using an output of the analog-to-digital converter,
   wherein the feature point extractor extracts, as the feature points, magnitude values of at least two signals or values using the magnitude values of the at least two signals,
   in which each of the at least two signals is one peak signal of:
   a first peak signal corresponding to a signal of the largest value;
   an N-th peak signal that is one of peak signals output after the first peak signal; and
   an M-th peak signal that is one of peak signals output after the N-th peak signal,
   among the output of the analog-digital converter in a reflected wave section detected by the ultrasonic sensor.

2. The system of claim 1, wherein the feature point extractor further extracts, as the feature points, at least one interval value or a value using the at least one interval value,
   in which each of the at least one interval value is a value of one time interval of:
   a first time interval that is a time interval between the first peak signal and the N-th peak signal;
   a second time interval that is a time interval between the first peak signal and the M-th peak signal;
   a third time interval that is a time interval between the N-th peak signal and the M-th peak signal; and
   a fourth time interval that is a time interval between the first peak signal and a K-th signal; and
   the K-th signal has a magnitude of a value greater than a smallest value, by a second value, among the output of the analog-digital converter in the reflected wave section detected by the ultrasonic sensor.

3. The system of claim 1, further comprising:
   an object recognizer recognizing the object by using the feature points extracted from the feature point extractor.

4. The system of claim 3, wherein the object recognizer determines the object as a first group of objects, when one peak value is extracted from the output of the analog-digital converter in a reflected wave section detected by the ultrasonic sensor as the feature points extracted from the feature point extractor; and
   the object recognizer determines the object as a second group of objects, when multiple peak values are extracted from the output of the analog-digital converter in the reflected wave section detected by the ultrasonic sensor as the feature points extracted from the feature point extractor.

5. The system of claim 3, wherein the object recognizer identifies the object by comparing the feature points extracted from the feature point extractor and feature points for each object stored in advance.

6. An object recognition method using an ultrasonic sensor, the method comprising:
   amplifying an output of the ultrasonic sensor;
   converting an output resulting from the amplifying into a digital signal; and
   extracting feature points using an output resulting from the converting,
   wherein the extracting of the feature points includes extracting, as the feature points, magnitude values of at least two signals or values using the magnitude values of the at least two signals,
   in which each of the at least two signals is one peak signal of:
   a first peak signal corresponding to a signal of the largest value;
   an N-th peak signal that is one of peak signals output after the first peak signal; and
   an M-th peak signal that is one of peak signals output after the N-th peak signal,
   among the output of the converting in a reflected wave section detected by the ultrasonic sensor.

7. The method of claim 6, wherein the extracting of the feature points includes further extracting, as the feature points, at least one interval value or a value using the at least one interval value,
   in which each of the at least one interval value is a value of one time interval of:
   a first time interval that is a time interval between the first peak signal and the N-th peak signal;
   a second time interval that is a time interval between the first peak signal and the M-th peak signal;
   a third time interval that is a time interval between the N-th peak signal and the M-th peak signal; and
   a fourth time interval that is a time interval between the first peak signal and a K-th signal; and the K-th signal has a magnitude of a value greater than a smallest value, by a second value, among the output of the converting in the reflected wave section detected by the ultrasonic sensor.

8. The method of claim 6, further comprising:
recognizing the object by using the feature points extracted from the extracting of the feature points.

9. The method of claim 8, wherein the recognizing of the object includes:
determining the object as a first group of objects, when one peak value is extracted from the output from the converting in a reflected wave section detected by the ultrasonic sensor as the feature points extracted from the extracting of the feature points; and
determining the object as a second group of objects, when multiple peak values are extracted from the output from the converting in the reflected wave section detected by the ultrasonic sensor as the feature points extracted from the extracting of the feature points.

10. The method of claim 8, wherein the recognizing of the object includes identifying the object by comparing the feature points extracted from the extracting of the feature points and feature points for each object stored in advance.

11. An object recognition system using an ultrasonic sensor, the system comprising:
an amplifier amplifying an output of the ultrasonic sensor;
an analog-to-digital converter converting an output of the amplifier into a digital signal;
a feature point extractor extracting feature points using an output of the analog-to-digital converter; and
an object recognizer recognizing the object by using the feature points extracted from the feature point extractor,
wherein the object recognizer determines the object as a first group of objects, when one peak value is extracted from the output of the analog-digital converter in a reflected wave section detected by the ultrasonic sensor as the feature points extracted from the feature point extractor; and
the object recognizer determines the object as a second group of objects, when multiple peak values are extracted from the output of the analog-digital converter in the reflected wave section detected by the ultrasonic sensor as the feature points extracted from the feature point extractor.

12. The system of claim 11, wherein the object recognizer identifies the object by comparing the feature points extracted from the feature point extractor and feature points for each object stored in advance.

* * * * *